US006901388B2

(12) United States Patent
Miller

(10) Patent No.: US 6,901,388 B2
(45) Date of Patent: May 31, 2005

(54) METHOD AND SYSTEM FOR METERING MIXED WEIGHT MAIL PIECES AT AN INCREASED AVERAGE RATE

(75) Inventor: John P. Miller, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 43 days.

(21) Appl. No.: 10/165,515

(22) Filed: Jun. 7, 2002

(65) Prior Publication Data

US 2003/0229602 A1 Dec. 11, 2003

(51) Int. Cl.[7] .............................................. G06F 17/60

(52) U.S. Cl. ...................... 705/407; 705/408; 705/414; 705/415; 702/173; 177/25.15

(58) Field of Search ........................... 705/1, 414, 415, 705/400, 401, 407, 408, 405; 702/173; 177/25, 15

(56) References Cited

U.S. PATENT DOCUMENTS 4,351,033 A 9/1982 Uchimura et al. .......... 364/900
4,516,209 A 5/1985 Scribner ..................... 364/466
4,742,878 A 5/1988 Freeman et al. ............. 177/25
4,787,048 A 11/1988 Freeman et al. ............ 364/466
5,119,306 A 6/1992 Metelits et al. ........ 364/464.02
5,142,482 A * 8/1992 Sansone ..................... 705/408
5,172,783 A 12/1992 Feinland et al. ............ 177/185
5,178,228 A 1/1993 Feinland et al. ............ 177/185
5,226,496 A 7/1993 Feinland et al. ......... 177/25.15
5,717,166 A 2/1998 Talmadge ................ 177/25.13
5,723,825 A 3/1998 Dolan et al. ................ 177/145

FOREIGN PATENT DOCUMENTS

EP 0782113 A2 * 7/1997
GB 2188592 A * 10/1987

OTHER PUBLICATIONS

John Derrick, "The Meter Is Running", Sep. 1994, Office Systems, v11n9, pp. 32–40.*

Lydia Graham, "Neopost Introduces SM95 Mailing Machine for Faster Mail Processing", Jan. 10, 2000, 3 pages, available at www.neopost.com.*

* cited by examiner

*Primary Examiner*—John G. Weiss
*Assistant Examiner*—Richard Woo
(74) *Attorney, Agent, or Firm*—Brian A. Lemm; Angelo N. Chaclas

(57) ABSTRACT

A method for printing indicia on mailpieces at an increased average speed. The system includes: a postal scale for determining a postage amount for a mail piece; a printer; and a postage meter responsive to the postal scale to control the printer to print an indicium representative of the postage amount. The postage meter further includes: a programmable controller; a secure mechanism for accounting for postage amounts expended; and an indicia generator. The programmable controller is programmed in accordance with the method of the present invention to: respond to a first signal from the postal scale to debit the secure mechanism for a minimum postage amount and to generate an indicium representative of the minimum amount; and, if the determined postage amount equals the minimum amount, respond to a second signal representative of the determined postage amount to print the indicium representative of the minimum postage amount; and, if the determined postage amount is greater than the minimum postage amount, respond to the second signal to debit the secure mechanism for the determined postage amount less the minimum postage amount; delete the indicium representative of the minimum postage amount; generate an indicium representative of the determined postage amount; and print the indicium representative of the determined postage amount on the mail piece.

18 Claims, 5 Drawing Sheets

METHOD AND SYSTEM FOR METERING MIXED WEIGHT MAIL PIECES AT AN INCREASED AVERAGE RATE

BACKGROUND OF THE INVENTION

The present invention relates to a system and method for rapid weighing and metering of items. More particularly it relates to postage metering systems used to weigh, determine postage for, and meter (i.e. imprint with a postal indicium representative of the postage determined) mail pieces or the like.

Postal scale systems are well known. Such scale systems weigh a mail piece and determine the appropriate postage for that mail piece as a function of the weight. Postal mailing systems where a mail piece is transported onto a postage scale system, the appropriate postage is determined, and the mail piece is then transported to postage metering system for imprinting with a postal indicium representative of the postage determined are also known. One such system is described in U.S. Pat. No. 4,742,878; issued May 10, 1988. In such systems there is a constant need to increase the rate at which the scale can determine the weight of a mail piece in order that the throughput of the system can be increased.

U.S. Pat. No. 4,787,048; issued: Nov. 22, 1988, discloses one approach to decreasing the time required for a postage scale system to determine the weight of a mail piece. The system disclosed in this patent takes advantage of the structure of postage rate charts, i.e., the function that relates the weight of the mail piece to the appropriate postage amount. Such rate charts provide a constant postage value for all weights between a pair of predetermined weight breaks. The system of the ’048 patent takes advantage of this by use of an algorithm where a first estimate of the weight is made and used to determine the postage amount unless the first estimate is within a predetermined distance of a break point, in which case a second more accurate estimate is made.

While such systems have proven to be highly satisfactory for their intended purpose a basic problem remains that the weight of each mail piece in batches of mixed weight mail must be determined and the corresponding postage amount calculated before the vault (i.e. secure accounting registers which track postage expended by the meter to assure that the postal service receives payment for all mail pieces metered) can be debited for the postage amount and an appropriate indicium generated. Because of the secure nature of the vault and the complexity of modern digitally printed indicia, which typically use encryption to assure that each indicium is uniquely identified with its mail piece to prevent generation of counterfeit indicia, these processes take a significant amount of time; requiring that the transport be longer than otherwise necessary, or be slowed or stopped, to provide dead time to account for postage amounts expended and to ready an indicium for printing.

Thus it is an object of the present invention to provide a method and system for increasing the average time available to generate indicia and account for postage expended without increasing dead time.

BRIEF SUMMARY OF THE INVENTION

The above object is achieved and the disadvantages of the prior art are overcome in accordance with the present invention by means of a method and system for printing postal indicia on mail pieces where the system includes: a postal scale for determining a postage amount for a mail piece as a function of a weight for the mail piece; a printer; and a postage meter responsive to the postal scale to control the printer to print the mail piece with an indicium representative of the postage amount. The postage meter further includes: a programmable controller; a secure mechanism for accounting for postage amounts expended; and an indicia generator. The programmable controller is programmed in accordance with the method of the present invention to: respond to a first signal from the postal scale to debit the secure mechanism for a minimum postage amount and control the indicia generator to generate an indicium representative of the minimum amount; and, if the determined postage amount equals the minimum amount, respond to a second signal representative of the determined postage amount to control the printer to print the indicium representative of the minimum postage amount on the mail piece; and, if the determined postage amount is greater than the minimum postage amount, respond to the second signal to debit the secure mechanism for the determined postage amount less the minimum postage amount; delete the indicium representative of the minimum postage amount; control the indicia generator to generate an indicium representative of the determined postage amount; and to control the printer to print the indicium representative of the determined postage amount on the mail piece.

In accordance with one aspect of the present invention the first signal is representative of the minimum postage amount.

In accordance with another aspect of the present invention the controller is responsive to the second signal to generate a secure print fire signal to initiate printing of the indicium, whereby printing of the indicia representative of the minimum postage amount before the determined postage amount is received by the controller is prevented.

In accordance with still another aspect of the present invention the postal scale includes a transport for transporting and supporting a mail piece to be weighed; a transducer mechanism for providing a weight signal representative of a weight for the mailpiece; a programmable scale controller for responding to the weight signal to determine the postage amount, and for controlling transport of, the mail piece. The programmable scale controller is programmed in accordance with the method of the present invention to: respond to the presence of the mail piece on the transport to output a first signal; and thereafter, respond to the weight signal to determine the postage amount and output a second signal representative of the postage amount.

In accordance with another aspect of the present invention the programmable scale controller is further programmed to, after outputting the first signal: respond to the weight signal to make an initial approximation of the weight; and, if the approximation is substantially less than a first break weight, output the second signal representative of the minimum postage amount; and, otherwise, respond to the weight signal to make a more accurate determination of the weight and output a second signal representative of the postage amount in accordance with the more accurate determination.

Other objects and advantages of the present invention will be apparent to those skilled in the art from consideration of the detailed description set forth below and the attached drawings.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF PREFERRED EMBODIMENTS OF THE INVENTION

Figure 1:
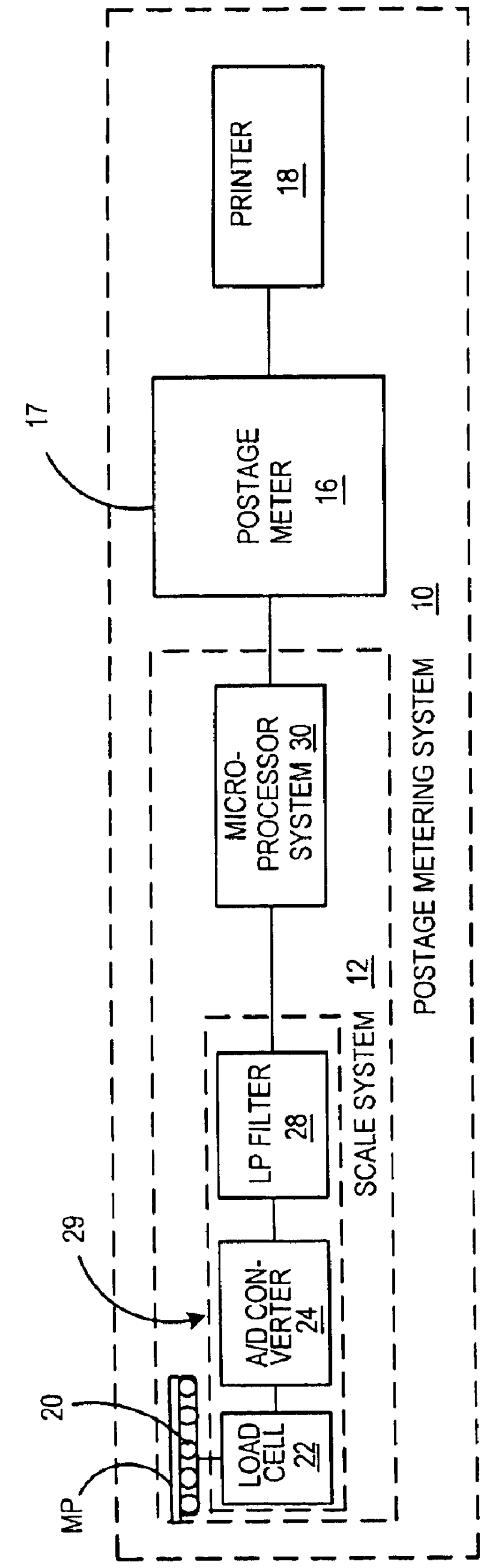
FIG. 1 shows a schematic block diagram of a system in accordance with the present invention for metering of mixed weight mail pieces.

FIG. 1 shows postage metering system 10, which includes scale system 12, postage meter 16 and printer 18. As is well known in the art, meter 16 is enclosed in secure housing 17 to prevent tampering. Scale system 12 includes transport 20, which supports a mail piece during a weighing operation and then transports the mail piece to printer 18 for printing with a postal indicium; load cell 22, which supports transport 20 and which generates an analog output representative of the instantaneous load it supports; analog-to-digital converter 24, which converts the output of load cell 22 to digital form; and low pass digital filter 28, which processes the output of converter 24 to reduce or eliminate the effects of vibrations. Microprocessor system 30 functions as the programmable controller for scale system 12, as will be described further below.

Together load cell 22, converter 24 and filter 28 comprise transducer mechanism 29, which generates a digital weight signal (i.e. a time series of digital values) representative of the instantaneous load supported by cell 22. Other types of transducer mechanisms are known, or may be developed in the future, and details of the operation of particular transducer mechanisms used form no part of the present invention.

Micro processor system 30 first detects the presence of mail piece MP and sends a first signal S1 to postage meter 16 to initiate generation of an indicium representative of a minimum postage amount and accounting for that amount. Preferably signal S1 will be representative of the minimum amount. Microprocessor 30 can determine the presence of mail piece MP from analysis of the transient response of the weight signal in a well known manner or, in other embodiments scale system 12 can include sensors to signal the presence of mail piece MP. Microprocessor system 30 then receives the weight signal from transducer mechanism 29 and processes it to determine a weight for the mail piece in process. It then accesses postal rate charts (not shown) to determine a postage amount for the mail piece in process as a function of the mail piece weight, and possibly as a function of other mail piece data such as class of service or special services requested for the mail piece. Typically such rate charts will be updated periodically in any convenient manner as postal services change their rates. Microprocessor system 30 then outputs a second signal S2 representative of the postage amount to postage meter 16 and also controls the operation of transport 20 to assure that the arrival of mail piece MP at printer 18 is properly synchronized with the operation of meter 16, as will be described further below.

Except as will be described further below with regard to the present invention, operation of such postage metering systems is well known and need not be described further here for an understanding of the present invention.

Figure 2:
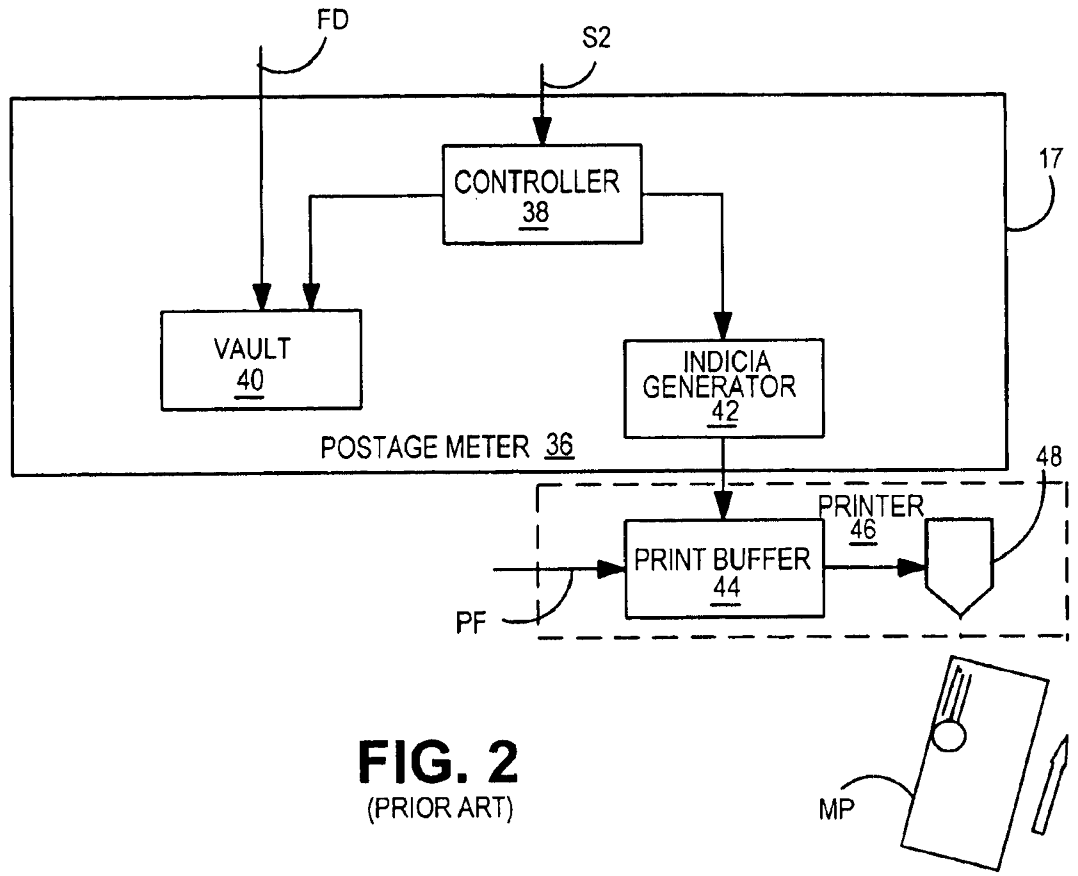
FIG. 2 (PRIOR ART)
FIG. 2 shows a schematic block diagram of a prior art postage meter.

FIG. 2 shows prior art postage meter 36 which includes controller 38; vault 40, which is a secure accounting mechanism used to track postage amounts expended; and indicia generator 42, which generates a digital indicium to be printed on mail piece MP as proof of payment of postage. Initially, funds data FD representative of prepaid postage is loaded into vault 40 in a secure manner. (Post-payment systems, where the secure accounting system only tracks postage expended and periodic payments to a postal service are made accordingly, are also known.) When signal S2, representative of a postage amount is received, controller 38 debits the postage amount from vault 40 and controls indicia generator 42 to generate an indicium which includes a representation of the postage amount as well as other data such as the date and meter serial number. The indicium is then downloaded to print buffer 44 of printer 18. When mail piece MP is appropriately positioned print fire signal PF causes printer 18 to control printhead 48 to print the indicium stored in buffer 44 onto mail piece MP. It should be noted that, because signal PF is not secure, the postage amount must be considered expended once it is downloaded to buffer 44, even if it is later erased without having been printed.

As noted above, because the acceptance of metered mail by postal services depends on the vault being sufficiently secure so that indicia can only be generated if sufficient funds are available in vault 40 and the proper postage amount has been debited from vault 40; and because the digital indicia are typically encrypted to assure that each indicium is uniquely identified with its mail piece to prevent generation of counterfeit indicia, a significant amount of time is required to carry out these processes; which in turn means that transport of mail piece MP must be delayed after its weight is determined longer than otherwise would be necessary, either by lengthening the transport path, slowing the transport speed, or temporarily slowing or stopping the transport.

Figure 3:
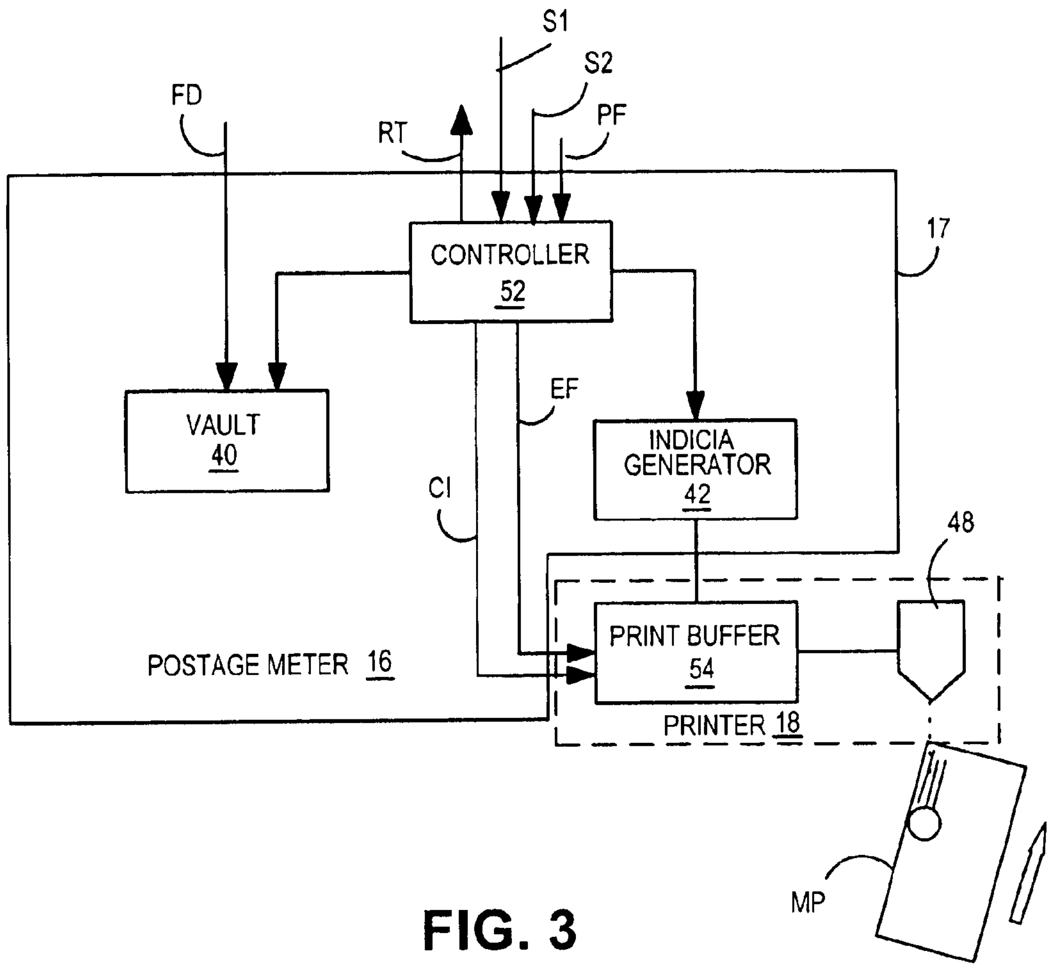
FIG. 3 shows a schematic block diagram of a postage meter in accordance with the present invention.

FIG. 3 shows postage meter 16 in accordance with the present invention. Meter 16 includes controller 52; vault 40; and indicia generator 42. As in prior art meter 36, initially funds data FD representative of prepaid postage is loaded into vault 40 in a secure manner. In addition to signal S2, representative of a postage amount for mail piece MP, controller 52 receives signal S1, which indicates the presence of mail piece MP on scale system 12 and print fire signal PF. Controller 52 outputs resume transport signal RT to scale system 12, and outputs encrypted print fire signal EP and clear indicia signal Cl to printer 18.

Figure 4:
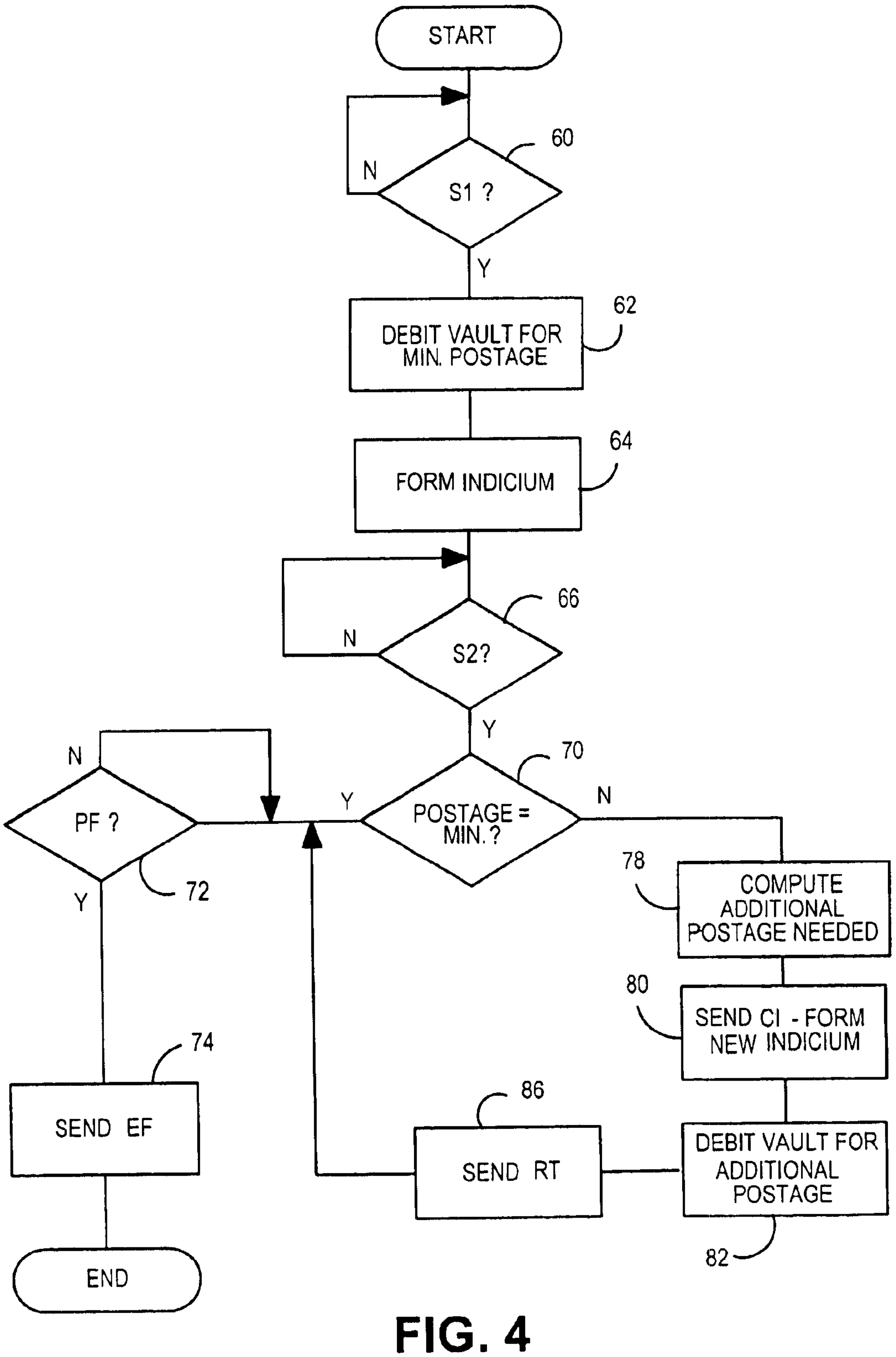
FIG. 4 shows a flow diagram of the operation of the postage meter of FIG. 3 in accordance with the method of the present invention.

FIG. 4 shows a flow diagram of the operation of meter 16 in accordance with the method of the present invention. At step 60 controller 52 waits for signal S1 which indicates the presence of mail piece MP on scale system 12. At step 62 controller 52 debits vault 40 for a minimum postage amount and at step 64 controls indicia generator 42 to generate, and download to print buffer 54 a corresponding indicium. In a preferred embodiment signal S1 is representative of the minimum postage value. In other embodiments meter 12 can store the minimum value but determination from signal S1 is preferred since this requires storage in, and updating of, only scale system 12. At step 66 controller 52 waits for signal S2 to determine the actual postage amount for mail piece MP and at step 70 determines if the postage amount is equal to the minimum postage amount.

If so, at step 72 controller 52 waits for print fire signal PF and then at step 74 outputs encrypted print fire signal EF to initiate printing of the minimum postage indicium on mail piece MP by printer 18 and then exits. Signal EF can be encrypted in any convenient manner that is believed to provide sufficient security and preferably is encrypted in accordance with the indicium to be printed. That is, variable data comprised in the indicium is used as, or to generate by means of a secret pseudorandom function, signal EF.

As is well known in the art, signal PF can be generated in any convenient manner, such as by a sensor positioned to detect when mail piece MP is properly positioned with respect to printhead 48, or by measuring the time elapsed, or distance traveled by mail piece MP after receipt of signal S2.

Otherwise, at step 78 controller 52 computes the additional postage needed, at step 80 sends signal Cl to printer 18 to clear or delete the minimum postage indicium and controls indicia generator 42 to generate, and download to print buffer 54, an indicium corresponding to the actual postage amount for mail piece MP, and at step 82 debits vault 40 for the additional postage needed. Then, at step 86 controller 52 send signal RT to scale system 12 to restart transport of mail piece MP and goes to step 72.

In other embodiments of the present invention only portions of the new indicium, which are changed are generated and downloaded. As used herein the term "delete" is intended to include this or any other convenient method for replacing the minimum postage indicium with a new indicium.

Note that by encrypting signal EF postal services can be assured that a minimum postage indicium downloaded to buffer 54 will not be printed unless the minimum postage value is confirmed by scale system 12, and that for mailpieces which weigh less that the first break weight (i.e. the actual postage amount is the minimum amount), which are typically the great majority, the accounting and indicia generation functions are carried out concurrently with the weighing function and the mail piece can be transported without delay.

Figure 5:
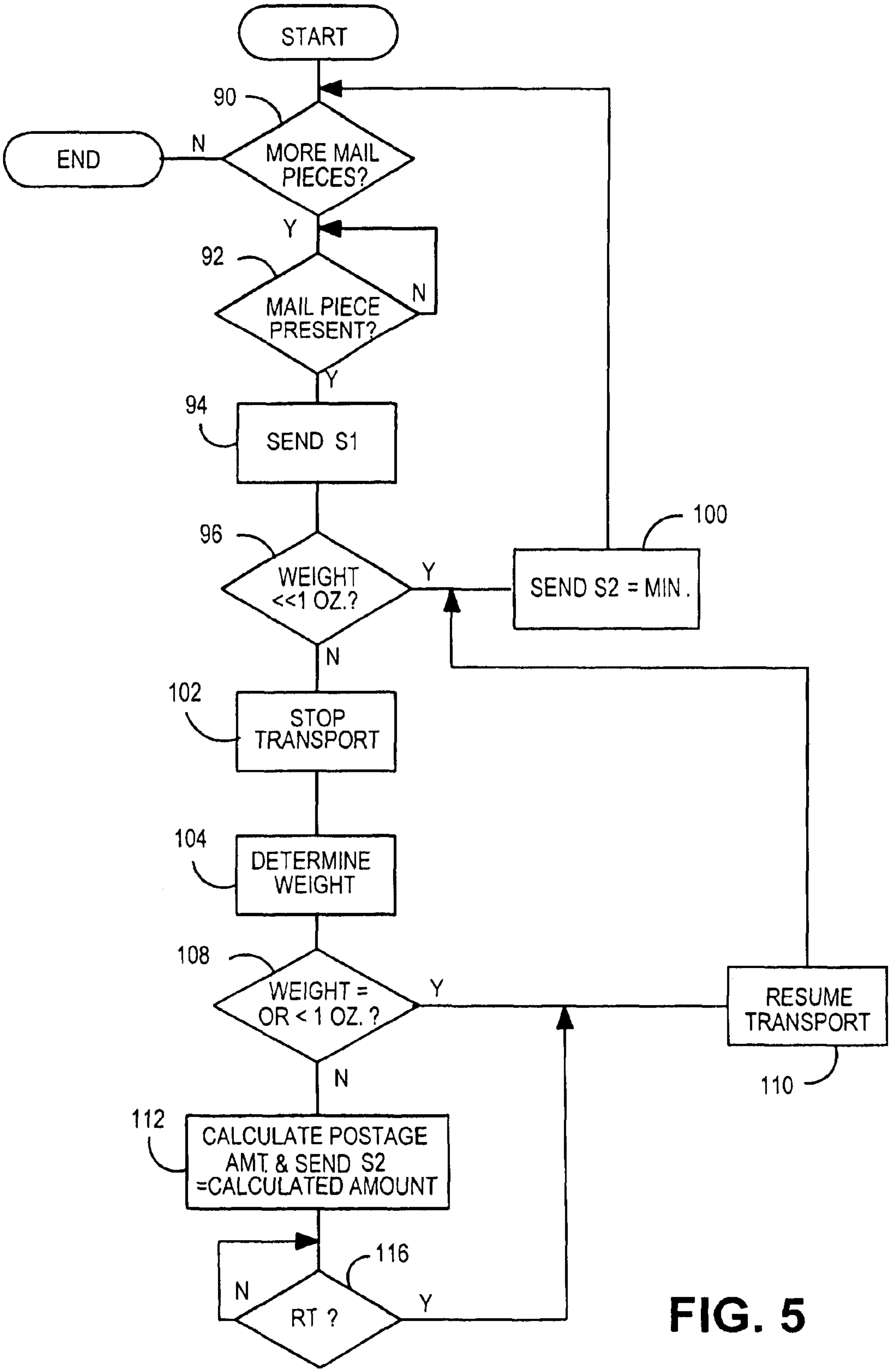
FIG. 5 shows a flow diagram of the operation of the scale system of FIG. 1 in accordance with the method of the present invention.

FIG. 5 shows a flow diagram of the operation of scale system 12 in accordance with the method of the subject invention. At step 90 microprocessor system 30 determines if there are more mail pieces to be processed and, if not, exits; and otherwise, at step 92 waits for the arrival of mailpiece MP on transport 20. When microprocessor system 30 detects arrival of mail piece MP at transport 20, preferably by detection of a transient response of the weight signal in a manner well known to those skilled in the art, at step 94 it outputs signal S1, which is preferably representative of the current minimum postage value for the class of service requested for mail piece MP and inclusive of any special services requested. Then at step 96 system 30 processes the weight signal to make an initial approximation of the weight of mail piece MP to determine if it is clearly less than the first break weight, typically one ounce, and if so, actually requires only the minimum postage amount. If so, at step 100 microprocessor system 30 sends signal S2 representative of a minimum postage amount for mail piece MP and returns to step 90. Methods for making initial approximations of weights are known to those skilled in the art and details of particular methods used form no part of the present invention. A preferred method is disclosed in commonly assigned, co-pending U.S. patent application Ser. No. 10/165,161, entitled "SYSTEM AND METHOD FOR FAST WEIGHING OF ITEMS SUCH AS MAILPIECES", which is hereby incorporated by reference.

Otherwise, at step 102 microprocessor system 30 stops transport 20 and at step 104 makes a more accurate determination of the weight of mail piece MP. Methods for making accurate determinations of weights are known to those skilled in the art and details of particular methods used form no part of the present invention. In other embodiments of the present invention transport 20 is only slowed to allow time for accounting and generation of a new indicium, as described above. Then at step 108 system 30 determines if the weight of mail piece MP is equal to or less than one ounce (or other first break weight) and, if so, at step 110 resumes transport and goes to step 100 and then to step 90 to process the next mail piece.

Otherwise, at step 112 microprocessor system 30 calculates the postage for mail piece MP and sends signal S2 representative of the calculated postage amount. Then at step 116 system 30 waits for signal RT indicating that postage meter 16 has completed accounting and indicia generation functions for mail piece MP and then goes to step 110.

In another embodiment of the present invention scale system 12 computes the difference between the minimum and actual postage amounts, and signal S2 represents the actual postage amount as that difference, i.e. as an offset from the minimum postage amount, so that that calculation does not need to be carried out by meter 16 to debit vault 40, though the actual postage would be regenerated by meter 16 for the new indicium.

The embodiments described above and illustrated in the attached drawings have been given by way of example and illustration only. From the teachings of the present application those skilled in the art will readily recognize numerous other embodiments in accordance with the present invention.

What is claimed is:

1. A system for printing postal indicia on mail pieces, comprising:
   - a postal scale for determining a postage amount for a mail piece as a function of a weight for said mail piece;
   - a printer;
   - a postage meter responsive to said postal scale to control said printer to print said mail piece with an indicium representative of said postage amount, said postage meter including a secure mechanism for accounting for postage amounts expended and an indicia generator;
   - means for responding to a first signal from said postal scale to debit said secure mechanism for a minimum postage amount and control said indicia generator to generate an indicium representative of said minimum amount;
   - means for responding to a second signal representative of said determined postage amount to control said printer to print said indicium representative of said minimum postage amount on said mail piece if said determined postage amount equals said minimum amount; and
   - means for responding to said second signal to debit said secure mechanism for said determined postage amount less said minimum postage amount, delete said indicium representative of said minimum postage amount, control said indicia generator to generate an indicium representative of said determined postage amount, and to control said printer to print said indicium representative of said determined postage amount on said mail piece if said determined postage amount is greater than said minimum postage amount.

2. A system as described in claim 1 where said first signal is representative of said minimum postage amount.

3. A system as described in claim 1 where said means for responding to said second signal further includes means to generate a secure print fire signal to initiate printing of said indicium, whereby printing of said indicia representative of said minimum postage amount before said determined postage amount is received by said controller is prevented.

4. A system as described in claim 3 where said secure print fire signal is encrypted.

5. A system as described in claim 4 where said secure print fire signal is encrypted in accordance with an indicia to be printed in response to said secure print fire signal.

6. A system as described in claim 1 where said second signal represents said determined postage amount as an offset from said minimum postage amount.

7. A postage meter responsive to a postal scale to control a printer to print a mail piece with an indicium representative of a postage amount, said postage meter comprising:

a secure mechanism for accounting for postage amounts expended;

an indicia generator;

means for responding to a first signal from said postal scale to debit said secure mechanism for a minimum postage amount and control said indicia generator to generate an indicium representative of said minimum amount;

means for responding to a second signal representative of a determined postage amount for said mail piece to control said printer to print said indicium representative of said minimum postage amount on said mail piece if said determined postage amount equals said minimum amount; and means for responding to said second signal to debit said secure mechanism for said determined postage amount less said minimum postage amount, delete said indicium representative of said minimum postage amount, control said indicia generator to generate an indicium representative of said determined postage amount, and to control said printer to print said indicium representative of said determined postage amount on said mail piece if said determined postage amount is greater than said minimum postage amount.

8. A meter as described in claim 7 where said first signal is representative of said minimum postage amount.

9. A meter as described in claim 7 where said means for responding to said second signal further includes means to generate a secure print fire signal to initiate printing of said indicium, whereby printing of said indicia representative of said minimum postage amount before said determined postage amount is received by said controller is prevented.

10. A meter as described in claim 9 where said secure print fire signal is encrypted.

11. A meter as described in claim 10 where said secure print fire signal is encrypted in accordance with an indicia to be printed in response to said secure print fire signal.

12. A meter as described in claim 7 where said second signal represents said determined postage amount as an offset from said minimum postage amount.

13. A method for printing postal indicia on mail pieces, said method comprising:

responding to presence of a mail piece to debit a secure accounting mechanism for a minimum postage amount and generate an indicium representative of said minimum amount;

if a postage amount determined for said mail piece equals said minimum amount, responding to a second signal representative of said determined postage amount to print said indicium representative of said minimum postage amount on said mail piece; and if said determined postage amount is greater than said minimum postage amount, responding to said second signal to debit said secure accounting mechanism for said determined postage amount less said minimum postage amount; delete said indicium representative of said minimum postage amount; generate an indicium representative of said determined postage amount; and to print said indicium representative of said determined postage amount on said mail piece.

14. A method as described in claim 13 where said first signal is representative of said minimum postage amount.

15. A method as described in claim 13 where printing of indicia is initiated by a secure print fire signal, whereby printing of said indicia representative of said minimum postage amount before said determined postage amount is received is prevented.

16. A method as described in claim 15 where said secure print fire signal is encrypted.

17. A method as described in claim 16 where said secure print fire signal is encrypted in accordance with an indicia to be printed in response to said secure print fire signal.

18. A method as described in claim 13 where said second signal represents said determined postage amount as an offset from said minimum postage amount.

* * * * *